(12) United States Patent
Maehara

(10) Patent No.: US 7,528,585 B2
(45) Date of Patent: May 5, 2009

(54) VEHICLE-USE POWER GENERATION CONTROL APPARATUS

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 230 days.

(21) Appl. No.: 11/783,717

(22) Filed: Apr. 11, 2007

(65) Prior Publication Data

US 2007/0247119 A1  Oct. 25, 2007

(30) Foreign Application Priority Data

Apr. 21, 2006  (JP) .............................. 2006-117869

(51) Int. Cl.
    *H02P 9/00* (2006.01)
    *H02J 7/16* (2006.01)
(52) U.S. Cl. .......................................... 322/59; 322/29
(58) Field of Classification Search ................. 322/22, 322/23, 25, 29, 37, 59
    See application file for complete search history.

(56) References Cited

U.S. PATENT DOCUMENTS

| 4,316,134 | A | * | 2/1982 | Balan et al. ................... 322/99 |
| 5,109,815 | A | | 5/1992 | Maeda et al. |
| 5,256,959 | A | | 10/1993 | Nagano et al. |
| 5,418,446 | A | * | 5/1995 | Hallidy .......................... 322/28 |
| 5,497,071 | A | * | 3/1996 | Iwatani et al. ................. 322/28 |
| 5,561,363 | A | * | 10/1996 | Mashino et al. ............... 322/25 |
| 5,637,985 | A | | 6/1997 | Kakizaki et al. |
| 5,703,410 | A | | 12/1997 | Maekawa |
| 6,900,618 | B2 | | 5/2005 | Maehara |
| 2002/0163320 | A1 | | 11/2002 | Buck |
| 2005/0135133 | A1 | * | 6/2005 | Maehara ..................... 363/144 |
| 2005/0140342 | A1 | * | 6/2005 | Maehara et al. .............. 322/36 |

FOREIGN PATENT DOCUMENTS

| DE | 41 08 751 A1 | 9/1991 |
| DE | 101 19 726 A1 | 11/2002 |
| DE | 10 2004 061 839 A1 | 7/2005 |
| EP | 691 21 922 T2 | 2/1997 |
| EP | 1 137 165 A2 | 9/2001 |
| EP | 1 168 569 A1 | 1/2002 |
| JP | A 58-217743 | 12/1983 |
| JP | A 05-176599 | 7/1993 |
| JP | A 08-205596 | 8/1996 |
| JP | A 11-351037 | 12/1999 |
| JP | A 2003-284257 | 10/2003 |
| JP | A 2003-289631 | 10/2003 |
| JP | A 2005-117842 | 4/2005 |

* cited by examiner

*Primary Examiner*—Nicholas Ponomarenko
(74) *Attorney, Agent, or Firm*—Oliff & Berridge, PLC

(57) ABSTRACT

The vehicle-use power generation control apparatus regulates an output voltage of a vehicle generator driven by a vehicle engine at a set value by on/off controlling an excitation current flowing through an excitation winding of the vehicle generator The vehicle-use power generation control apparatus includes a rotation detecting circuit detecting a rotational speed of the vehicle generator, and an excitation current control circuit reducing, when the rotation detecting circuit detects decrease of the rotational speed, the excitation current at a rate depending on a rate of the decrease of the rotational speed detected by the rotation detecting circuit.

19 Claims, 8 Drawing Sheets

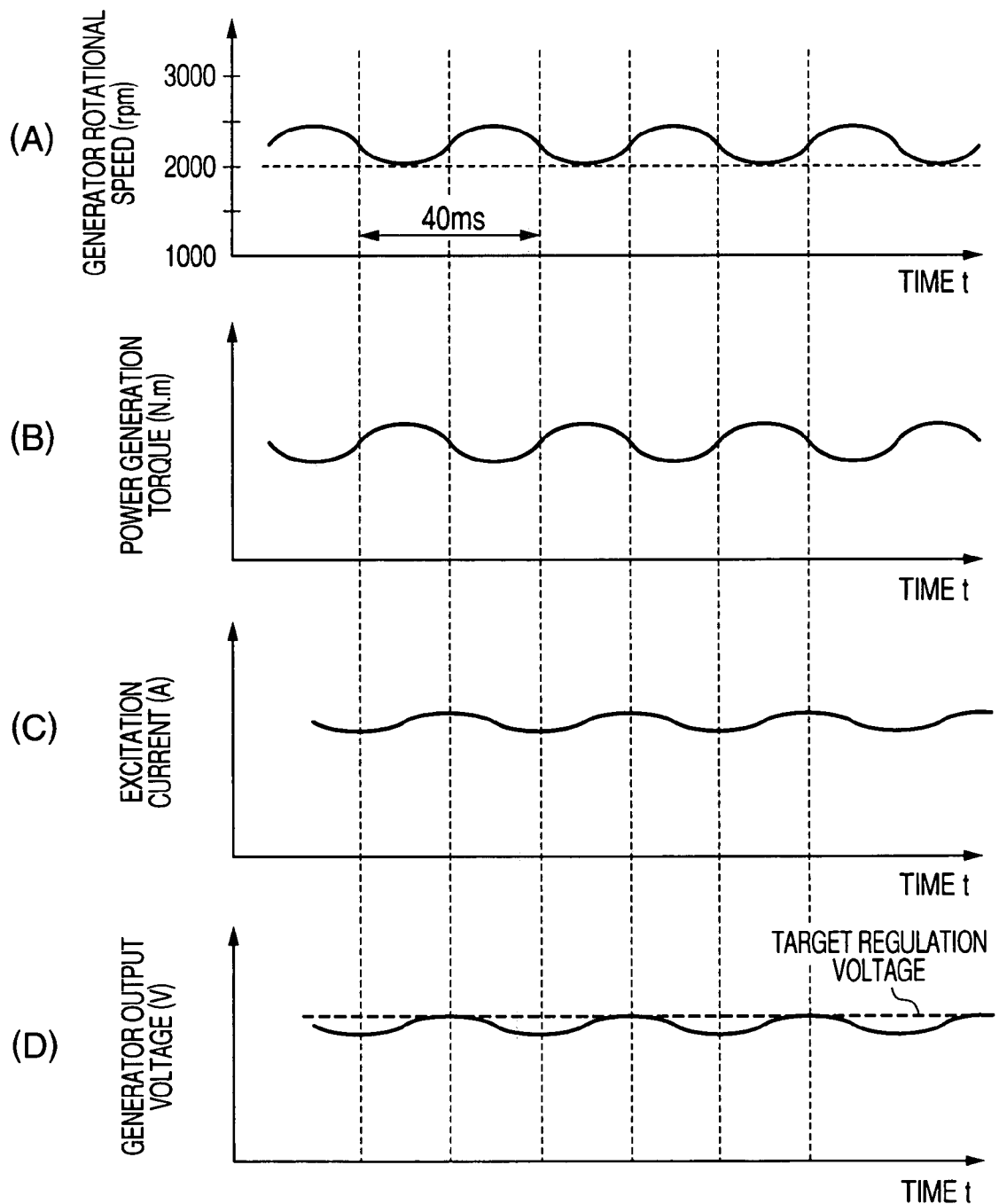

VEHICLE-USE POWER GENERATION CONTROL APPARATUS

CROSS-REFERENCE TO RELATED APPLICATION

This application is related to Japanese Patent Application No. 2006-117869 filed on Apr. 21, 2006, the contents of which are hereby incorporated by reference.

BACKGROUND OF THE INVENTION

1. Field of the Invention

The present invention relates to a vehicle-use power generation control apparatus for controlling a power generating operation of a generator mounted on a vehicle such as a passenger car or a truck.

2. Description of Related Art

There is known a technique in which, in order to reduce variation of a rotational speed of a vehicle engine depending on its combustion cycle when the vehicle engine is in an idle state, a power generation torque control is performed such that an excitation current of a vehicle generator driven by the vehicle engine is decreased to decrease a power generation torque of the vehicle generator at the timing when the engine rotational speed decreases, and the excitation current is increased to increase the power generation torque of the vehicle generator at the timing when the engine rotational speed increases (refer to Japanese Patent Application Laid-open No. 58-217743, for example). There is known another technique in which, in order to reduce hunting in a cycle of 2 to 3 seconds of a vehicle generator due to its power generation torque when the vehicle engine is in its idle state, a value of the power generation torque is constantly calculated on the basis of an excitation current of the vehicle generator and a rotational speed of the vehicle generator, and the excitation current is limited so that an increasing rate of the power generation torque is kept below a certain value (refer to Japanese Patent Application Laid-open No. 2003-284257, for example).

The former technique as disclosed in Japanese Patent Application Laid-open No. 58-217743, in which decrease or increase of the excitation current is determined on the basis of only the timing of decrease or increase of the engine rotational speed, has a problem in that although the rotational speed variation of the vehicle engine can be suppressed, a variation of an output voltage of the vehicle generator cannot be prevent from becoming large, because this technique does not take the output voltage variation of the vehicle generator into account. This can causes overcharge or overdischarge of a vehicle battery charged by the vehicle generator.

The latter technique as disclosed in Japanese Patent Application Laid-open No. 2003-284257 has a problem in that although the idle speed variation of the vehicle engine can be suppressed if it is due to the power generation torque variation of the vehicle generator, it cannot be suppressed if it is due to factors other than the power generation torque variation of the vehicle generator.

SUMMARY OF THE INVENTION

The present invention provides a vehicle-use power generation control apparatus for regulating an output voltage of a vehicle generator driven by a vehicle engine at a set value by on/off controlling an excitation current flowing through an excitation winding of the vehicle generator, comprising:

a rotation detecting circuit detecting a rotational speed of the vehicle generator; and an excitation current control circuit reducing, when the rotation detecting circuit detects decrease of the rotational speed, the excitation current at a rate depending on a rate of the decrease of the rotational speed detected by the rotation detecting circuit.

According to the vehicle-use power generation control apparatus of the present invention, it becomes possible to prevent the drive torque (power generation torque) of the vehicle generator from increasing sharply due to activation of an engine-driven auxiliary, or a gas pedal manipulation by a vehicle driver. This can stabilize the idle speed of the engine. Hence, according to the present invention, it is possible to prevent the vehicle from vibrating when there occurs the decrease of the idle speed, or the idle hunting phenomenon due to the increase of the power generation torque of the vehicle generator, or when the engine speed decreases by activation of an engine-driven auxiliary. Also, it becomes possible to prevent the engine from stalling and to prevent lamps or indicators mounted on the vehicle from flickering due to the variation of the output voltage of the vehicle generator. Furthermore, according to the present invention, fuel consumption can be improved, because this invention makes it possible to reduce the idle speed, and to reduce engine friction.

The excitation current control circuit may remove reduction of the excitation current when the rotation detecting circuit does not detect decrease of the rotational speed of the vehicle generator.

The excitation current control circuit may limit the excitation current to within a limit value calculated by subtracting a value of the rate of the decrease of the rotational speed multiplied by a predetermined control constant from a value of the excitation current currently flowing.

The excitation current control circuit may calculate a target torque by subtracting, from a power generation torque of the vehicle generator determined on the basis of a value of the excitation current currently flowing, and the detected rotational speed of the vehicle generator, a value of the rate of the decrease of the detected rotational speed multiplied by a predetermined control constant, and limit the excitation current to such a value that the power generation torque of the vehicle generator becomes equal to the calculated target torque.

The control constant may be substantially equal to a value corresponding to sum of moments of inertia of the vehicle generator, the vehicle engine and engine auxiliaries driven by the vehicle engine.

The control constant may be corrected in accordance with at least one of the detected rotational speed, an output voltage, and the excitation current of the vehicle generator.

The control constant may be corrected in accordance with one of a variation of the detected rotational speed and a variation of the output voltage of the vehicle generator when the excitation current control circuit reduces the excitation current.

The excitation current control circuit may receive the control constant from a control device external of the vehicle-use power generation control apparatus.

When the rotation detecting circuit does not detect decrease of the rotational speed of the vehicle generator, the excitation current control circuit may gradually increase the excitation current at a certain rate.

The certain rate may be corrected in accordance with at least one of the detected rotational speed, an output voltage, and the excitation current of the vehicle generator.

The certain rate may be corrected in accordance with at least one of a variation of the detected rotational speed and a variation of an output voltage of the vehicle generator when the excitation current control circuit reduces the excitation current.

The excitation current control circuit may receive the certain rate from a control device external of the vehicle-use power generation control apparatus.

The rotation detecting circuit and the excitation current control circuit may be built in the vehicle generator.

The rotation detecting circuit may be configured to detect the decrease of the rotational speed in which effect of rotational pulsation depending on an engine combustion cycle of the vehicle engine is reduced.

The rotation detecting circuit may be configured to detect the decrease of the rotational speed in only effect of rotational pulsation depending on an engine combustion cycle of the vehicle engine.

The excitation current control circuit may configured to individually detect a comparatively rapid decrease of the rotational speed due to an engine combustion cycle of the vehicle engine, and a comparatively gentle decrease of the rotational speed due to at least one of torque variation of the vehicle generator, torque variation of an engine auxiliary driven by the vehicle engine other than the vehicle engine, and variation of intake air amount, configured to calculate a first limit value on the basis of a value of the comparatively rapid decrease and a second limit value on the basis of a value of the comparatively gentle decrease, and configured to limit the excitation current to within a smaller one of the first limit value and the second limit value.

Other advantages and features of the invention will become apparent from the following description including the drawings and claims.

BRIEF DESCRIPTION OF THE DRAWINGS

In the accompanying drawings:

FIG. 10 is a diagram showing the behavior of the vehicle generator when there occurs rotational pulsation of the engine due to the engine combustion cycle in a case where the vehicle generator is controlled by the vehicle-use power generation control apparatus according to the embodiment of the present invention.

PREFERRED EMBODIMENTS OF THE INVENTION

Figure 1:
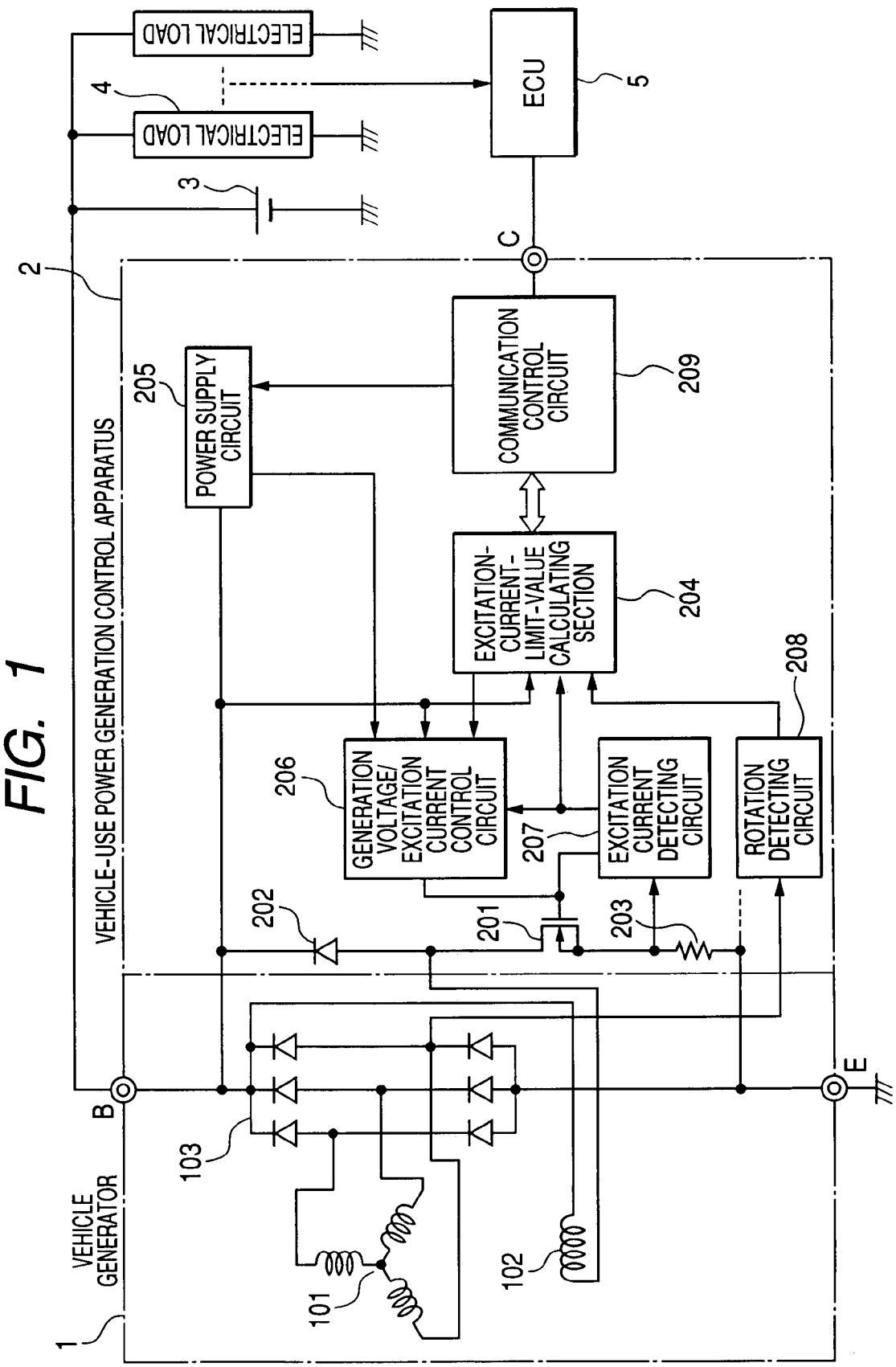
FIG. 1 is a diagram showing a structure of a vehicle-use power generation control apparatus according to an embodiment of the invention, which is connected to a vehicle generator, a vehicle battery, electrical loads, and an ECU (Electronic Control Unit)

FIG. 1 is a diagram showing a structure of a vehicle-use power generation control apparatus 2 according to a first embodiment of the invention, which is connected to a vehicle generator 1, a vehicle battery 3, electrical loads 4, and an ECU (Electronic Control Unit) 5.

The vehicle-use power generation control apparatus 2 operates to keep a voltage at an output terminal (B-terminal) of the vehicle generator 1 at a predetermined target regulation voltage (14V, for example). The vehicle-use power generation control apparatus 2 is provided with a communication terminal (C-terminal), and a ground terminal (E-terminal) in addition to the B-terminal. The B-terminal is connected to the battery 3 and to the electrical loads 4 through a charge line. The C-terminal is connected to the ECU 5 as an external control device. The E-terminal is connected to a frame of the vehicle generator 2. Although the vehicle-use power generation control apparatus 2 is shown as being disposed side by side with the vehicle generator 1, actually, it is built in the vehicle generator 1.

The vehicle generator 1 includes a three-phase stator winding 101 wound around a stator, an excitation winding 102 wound around a rotor, and a rectifier circuit 103 full-wave rectifying a three-phase AC output voltage of the stator winding 101. The control of the output voltage of the vehicle generator 1 is performed by on/off controlling the passage of a current to the excitation winding 102 by use of the vehicle-use power generation control apparatus 2.

Next, a structure and an operation of the vehicle-use power generation control apparatus 2 are explained. As shown in FIG. 1, the vehicle-use power generation control apparatus 2 includes an N-channel MOS-FET 201, a flywheel diode 202, a sense resistor 203, an excitation-current-limit-value calculating section 204, a power supply circuit 205, a generation voltage/excitation current control circuit 206, an excitation current detecting circuit 207, a rotation detecting circuit 208, and a communication control circuit 209.

The MOS-FET 201, which is series-connected to the excitation winding 102, allows an excitation current to flow through the excitation winding 102 when it is in the on state. The free-wheel diode 202, which is parallel-connected to the excitation winding 102, allows a surge current caused by a high voltage induced across the excitation winding 102 when the MOS-FET 201 is turned off to circulate across the excitation winding 102.

The power supply circuit 205 produces operation voltages to be supplied to components of the vehicle-use power generation control apparatus 2. The generation voltage/excitation current control circuit 206 operates to limit the output voltage of the vehicle generator 1 and the excitation current to within their respective set values. The excitation current detecting circuit 207 operates to detect the excitation current flowing through the excitation winding 102 on the basis of a source potential of the MOS-FET 201. More specifically, the excitation current detecting circuit 207 detects the excitation current on the basis of a voltage drop across the sense resistor 203 connected to the source of the MOS-FET 201 at one end thereof and connected to the E-terminal at the other end thereof, which depends on the excitation current flowing through a source-drain path of the MOS-FET 201 and the sense resistor 203. The rotation detecting circuit 208 operates to monitor a phase voltage across one of three phase coils of the stator winding 101 to detect a rotational speed of the vehicle generator 1, and to output a voltage in accordance with the detected rotational speed to the excitation-current-limit-value calculating section 204.

The excitation-current-limit-value calculating section 204 calculates an excitation current limit value within which the excitation current is limited to on the basis of the excitation current detected by the excitation current detecting circuit 207, the rotational speed of the vehicle generator 1 detected by the rotation detecting circuit 208, and the output voltage of the vehicle generator 1.

Figure 2:
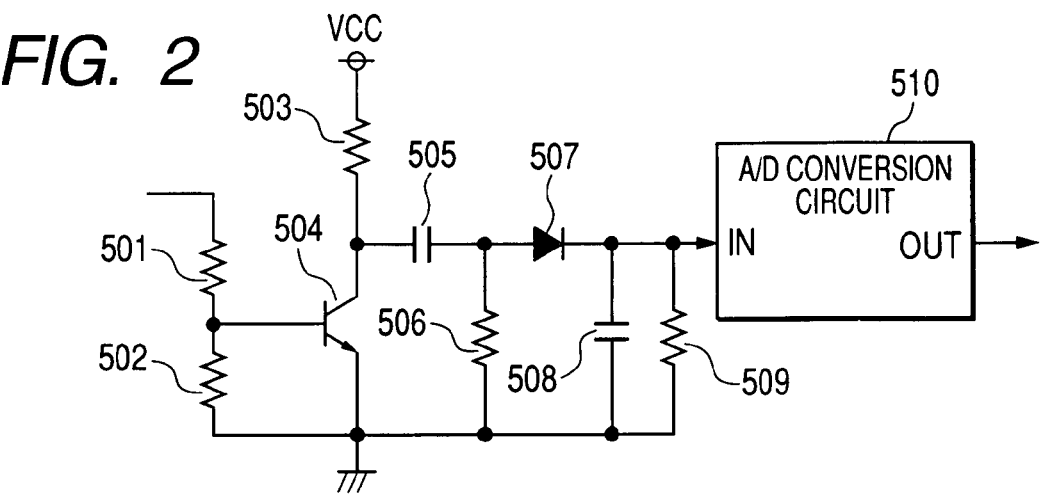
FIG. 2 is a diagram showing a structure of a rotation detecting circuit included in the vehicle-use power generation control apparatus shown in FIG. 1.

FIG. 2 is a diagram showing a structure of the rotation detecting circuit 208. As shown in this figure, the rotation detecting circuit 208 includes resistors 501, 502, 503, 506, 509, a transistor 504, capacitors 505, 508, a diode 507, and an A/D (analogue to digital) conversion circuit 510. A phase voltage across one of the phase coils of the stator winding 101 is divided down by a voltage dividing circuit constituted by the resistors 501, 502, and then applied to the base of the transistor 504. The phase voltage is shaped by a waveform shaping circuit constituted by the transistor 504, and the resistor 503 connected to the collector of the transistor 504 to become a phase voltage signal. This signal is inputted to a differentiating circuit constituted by the capacitor 505 and the resistor 506. The output of the differentiating circuit is rectified by the diode 507, and then inputted to a charge/discharge circuit constituted by the capacitor 508 and the resistor 509. The thus produced voltage signal having a voltage level proportional to the frequency of the phase voltage of the stator winding 101 is inputted to the A/D conversion circuit 510. The A/D conversion circuit 510 converts the inputted voltage signal into digital data formed by a certain number of bits (8 bits, for example).

Figure 3:
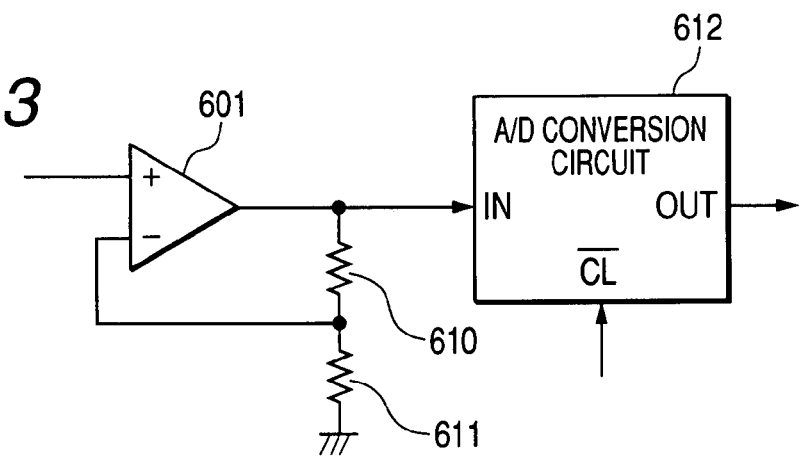
FIG. 3 is a diagram showing a structure of an excitation current detecting circuit included in the vehicle-use power generation control apparatus shown in FIG. 1.

FIG. 3 is a diagram showing a structure of the excitation current detecting circuit 207. As shown in this figure, the excitation current detecting circuit 207 includes an operational amplifier 601, resistors 610, 611, and an A/D conversion circuit 612. The operational amplifier 601 and the resistors 610, 611 constitute an amplifier with a gain determined by the resistances of the resistors 610, 611. This amplifier amplifies an input voltage whose voltage level is proportionate to the excitation current. The A/D conversion circuit 612 receives an output signal of this amplifier at its input terminal (IN), and a drive signal of negative logic outputted from the generation voltage/excitation current control circuit 206 at its clock terminal (CL). The A/D conversion circuit 612 loads the output signal of the amplifier at the timing when the drive signal changes from the high level to the low level, and converts it into digital data formed by a certain number of bits (8 bits, for example).

Figure 4:
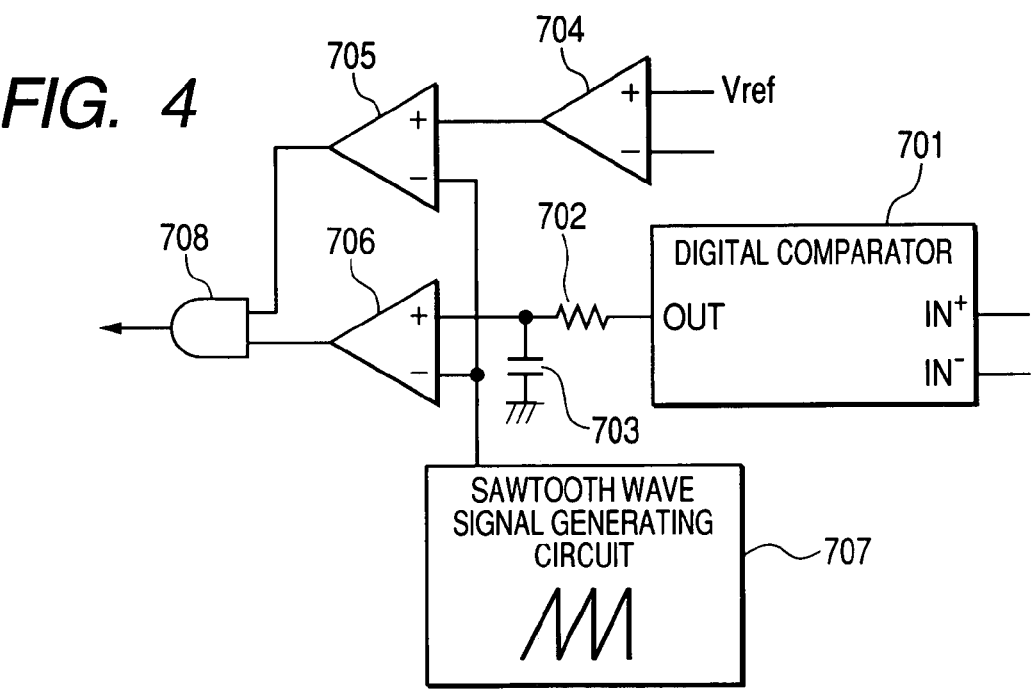
FIG. 4 is a diagram showing a structure of a generation voltage/excitation current control circuit included in the vehicle-use power generation control apparatus shown in FIG. 1.

FIG. 4 is a diagram showing a structure of the generation voltage/excitation current control circuit 206. As shown in this figure, the generation voltage/excitation current control circuit 206 includes a digital comparator 701, a resistor 702, a capacitor 703, a differential amplifier 704, voltage comparators 705, 706, a sawtooth wave signal generating circuit 707, and an AND circuit 708. The digital comparator 701 compares the excitation current limit value outputted from the excitation-current-limit-value calculating section 204 and applied to one input terminal (IN+) thereof with the detected value of the excitation current outputted from the excitation current detecting circuit 207 and applied to the other input terminal (IN−) thereof. As a result of the comparison, the digital comparator 701 outputs a high level signal when the excitation current limit value is larger than the detected value of the excitation current, and otherwise outputs a low level signal. The output signal of the digital comparator 701 is smoothed by a smoothing circuit constituted by the resistor 702 and the capacitor 703, and then applied to a positive input terminal of the voltage comparator 706. The voltage comparator 706, which receives, at the negative input terminal thereof, the sawtooth wave signal outputted from the sawtooth wave signal generating circuit 707, compares this sawtooth wave signal with the smoothed output signal of the digital comparator 701 received at the positive input terminal thereof. The differential amplifier 704 amplifies a difference between a reference voltage Vref produced by the power supply circuit 205 and the output voltage of the vehicle generator 1. An output signal of the differential amplifier 704 is applied to the positive input terminal of the voltage comparator 705. The voltage comparator 705, which receives, at the negative input terminal thereof, the sawtooth wave signal outputted from the sawtooth wave signal generating circuit 707, compares this sawtooth wave signal with the output signal of the differential amplifier 704 received at the positive input terminal thereof. As a result of the comparison, the voltage comparator 705 outputs a PWM signal having a duty ratio depending on the difference therebetween. The AND circuit 708 outputs a logical product signal of the output signal of the voltage comparator 705 and the output signal of the voltage comparator 706. This logical product signal is applied to the gate of the MOS-FET 201 as a drive signal, as a consequence of which a voltage control on the basis of the reference voltage Vref, or an excitation current control on the basis of the excitation current limit value is performed.

Next, the operation of the vehicle-use power generation control apparatus 2 having the above described structure is explained.

(1) Before Start of the Engine:

When a key switch (not shown) is turned on, a key-on signal is transmitted from the ECU 5 to the vehicle-use power generation control apparatus 2. The key-on signal received through the C-terminal by the communication control circuit 209 of the vehicle-use power generation control apparatus 2 is transferred to the power supply circuit 205. The power supply circuit 205 starts to produce the operation voltage to be supplied to the components of the vehicle-use power generation control apparatus 2.

While the engine is stopped and accordingly the vehicle generator 1 is stationary, the output voltage of the vehicle generator 1 is null, and the terminal voltage of the battery 3 is about 12V which is lower than the target regulation voltage (reference voltage Vref). Accordingly, when the key switch is turned on, the generation voltage/excitation current control circuit 206 outputs a high level signal (to be precise, a PWM signal with a duty ratio set at an upper limit value) to the MOS-FET 201. This causes the MOS-FET 201 to turn on with an on-time duty ratio at an upper limit value to allow the excitation current to flow through the excitation winding 102 at its maximum value.

(2) During Idle Time:

When the engine starts to rotate, and the rotational speed of the vehicle generator 1 reaches a certain idle speed, the vehicle generator 1 starts power generation. When the output voltage of the vehicle generator 1 exceeds the terminal voltage of the battery 3, the battery 3 is started to be charged, as a result of which the terminal voltage of the battery 3 is increased. When the output voltage of the vehicle generator 1 exceeds the target regulation voltage, the generation voltage/excitation current control circuit 206 outputs a low level signal (to be precise, a PWM signal with a duty ratio set at a lower limit value) to the MOS-FET 201. This causes the on-time duty ratio of the MOS-FET 201 to decrease, as a result of which the excitation current decreases, causing the output voltage of the vehicle generator 1 to decrease. When the output voltage of the vehicle generator 1 falls below the target regulation voltage, the MOS-FET 201 is again caused to turn on with an on-time duty ratio set at the upper limit value to allow the excitation current to flow through the excitation winding 102 at its maximum value. Through repetition of such an operation, the output voltage of the vehicle generator 1 is regulated around the target regulation voltage.

Figure 5:
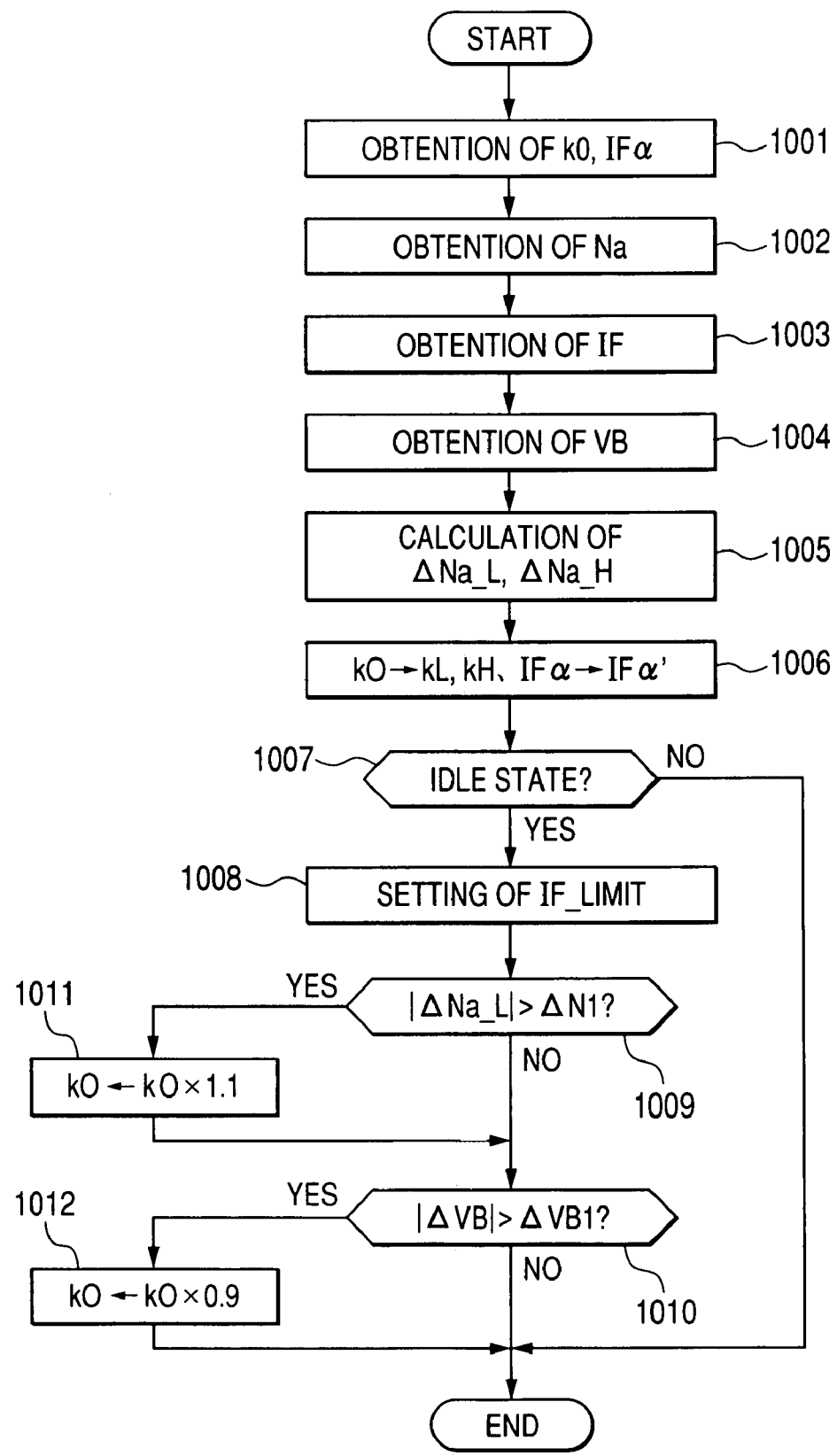
FIG. 5 is a flowchart showing operation steps performed by an excitation-current-limit-value calculating section included in the vehicle-use power generation control apparatus shown in FIG. 1 to determine an excitation current limit value.

Next, an operation of the excitation-current-limit-value calculating section 204 is explained. FIG. 5 is a flowchart showing operation steps performed by the excitation-current-limit-value calculating section 204 to determine the excitation current limit value. The sequence of the operation steps shown in FIG. 5 is repeated at regular time intervals (every 5 ms, for example) mainly during the idle time to determine the excitation current limit value.

First, the excitation-current-limit-value calculating section 204 obtains a control constant k0 and a dead zoned IFα from the ECU 5 at step 1001, obtains the rotational speed Na of the vehicle generator 1 from the rotation detecting circuit 208 at step 1002, obtains the excitation current IF from the excitation current detecting circuit 207 at step 1003, and obtains the output voltage VB from the vehicle generator at step 1004.

Next, the excitation-current-limit-value calculating section 204 calculates two kinds of deviations ΔNa_L, ΔNa_H at step 1005. The deviation ΔNa_L indicates a difference between the rotational speed Na obtained previous time that has been moving-averaged and the rotational speed Na obtained this time that has been moving-averaged.

That is, the deviation ΔNa_L=the moving average deviation (100 ms moving average deviation, for example) of the rotational speed Na obtained this time—the moving average deviation (100 ms moving average deviation, for example) of the rotational speed Na obtained previous time. The deviation ΔNa_L can be said to be a value indicating a rotational speed variation in a low frequency range of the engine in which effect of rotational pulsation depending on the engine combustion cycle has been reduced. On the other hand, the deviation ΔNa_H indicates a difference between the rotational speed Na obtained this time and the rotational speed obtained previous time, both which have not been subjected to any moving averaging process. That is, the deviation ΔNa_H=the rotational speed Na obtained this time-the rotational speed Na obtained previous time. The deviation ΔNa_H can be said to be a value indicating a rotational speed variation in a high frequency range of the engine due to rotational pulsation depending on the engine combustion cycle.

After that, the excitation-current-limit-value calculating section 204 corrects, at step 1006, the control constant k0 and the dead zoned IFα obtained from the ECU 5 on the basis of the rotational speed Na, excitation current IF, output voltage VB obtained this time. More specifically, a low-frequency-rotation-variation control constant kL and a high-frequency-rotation-variation control constant kH are calculated in accordance with the below indicated equations for correcting the control constant k0, and a dead zone IFα' is calculated in accordance with the below indicated equation for correcting the dead zone IFα.

The low-frequency-rotation-variation control constant
$$kL = kL = A \times k0 \times (B \times Na + C \times IF + D \times VB + E)$$

The high-frequency-rotation-variation control constant $kH = A' \times k0 \times (B' \times Na + C' \times IF + D' \times VB + E')$ The dead zone $IF\alpha' = F \times (Na - E) \times IF\alpha$ In these equations, A, B, C, D, E, F, A', B', C', D, ' are constants. Although the control constants kL, and kH are determined by correcting the control constant k0 on the basis of the three values of the rotational speed Na, the excitation current IF, and the output voltage VB in this embodiment, they may be determined by correcting the control constant k0 on the basis of at least one of these three values. Likewise, although the dead zone IFα' is determined by correcting the dead zone IFα on the basis of only the rotational speed Na in this embodiment, it may be determined by correcting the dead zone IFα on the basis of any one of the three values of the rotational speed Na, the excitation current IF, and the output voltage VB. Although the control constants kL, kH, and the dead zone IFα' have been described as to be calculated by the excitation-current-limit-value calculating section 204, they may be calculated by the ECU 5, and transmitted to the vehicle-use power generation control apparatus 2.

Thereafter, the excitation-current-limit-value calculating section 204 makes a judgment as to whether or not the engine is in the idle state at step 1007. This judgment may be such that the vehicle is determined to be in the idle state if the rotational speed Na of the vehicle generator 1 is lower than a predetermined value (3000 rpm, for example). Alternatively, this judgment may be more reliable one in which the engine is determined to be in the idle sate if vehicle information received from the ECU 5 indicates that a vehicle speed is 0 km/h, and a throttle is in the off position.

Next, the excitation-current-limit-value calculating section 204 performs setting of the excitation current limit value IF_LIMIT at step 1008. This setting is performed through the below indicated equation.

$$IF\_LIMIT = MIN(IF + kL \times \Delta Na\_L, IF + kH \times \Delta Na\_H, IF + IF\alpha')$$

Here, "MIN" is a function of extracting the minimum value of the three parameters inside the parentheses. This equation means that the excitation current limit value IF_LIMIT is set at the minimum one of the value of the currently detected excitation current IF added by kL×ΔNa_L, the value of the currently detected excitation current IF added by kH×ΔNa_H, and the value of the currently detected excitation current IF added by IFα'. By setting the excitation current limit value IF_LIMIT as above, it becomes possible to prevent the rotational speed of the engine from being lowered excessively, because, when the rotational speed of the engine decreases, the deviation ΔNa_L, or the deviation ΔNa_H becomes negative, causing the IF_LIMIT to become smaller than the currently detected excitation current IF, as a consequence of which the power generation torque decreases to suppress the decrease of the engine rotational speed. In more detail, in this embodiment, the comparatively rapid decrease (kH×ΔNa_H) of the rotational speed of the engine depending on the engine combustion cycle, and the comparatively gentle decrease of the rotational speed of the engine (kL×ΔNa_L) due to variation of the power generation torque, or variation of other auxiliares driven by the engine, or variation of intake air amount are individually calculated as IF+kH×ΔNa_H, and IF+kL×ΔNa_L, respectively. And the smaller one of these calculated values is used as the excitation current limit value within which the excitation current is limited to. This makes it possible to reduce the engine speed fluctuation regardless of whether it is due to external disturbance or engine combustion cycle. Incidentally although the smaller on of IF+kH×ΔNa_H, and IF+kL×ΔNa_L is selected when the engine rotational speed decreases in this embodiment, it is possible to use a predetermined one of these two values to simplify the calculation process.

On the other hand, when the engine rotational speed increases, the deviation ΔNa_L, or the deviation ΔNa_H becomes positive, and accordingly the excitation current limit value changes from the IF_LIMIT to the IF+IFα'. That is, the excitation current limit value is set at a value larger than the currently detected excitation current IF by IFα'. As a consequence, the excitation current increases at a certain rate if the output voltage of the vehicle generator 1 is lower than the target regulation voltage.

Next, the excitation-current-limit-value calculating section 204 judges at step 1009 whether the value of |ΔNa_L| is larger or smaller than a predetermined reference value ΔN1 when the engine rotational speed decreases. If it is judged that the value of |ΔNa_L| is larger than the predetermined reference value ΔN1, since it means that a large mechanical load other than the vehicle generator 1 is applied to the engine, and there is possibility of engine stall, the excitation-current-limit-value calculating section 204 corrects the value of the control constant k0 so that it becomes large (1.1 times as large as its original value, for example) at step 1011. As a consequence, the excitation current limit value becomes further small to increase the extent of suppression of the power generation torque, to thereby suppress the engine rotational speed decrease.

The excitation-current-limit-value calculating section 204 also judges at step 1010 whether or not the value of |ΔVB| (an amount of decrease of the output voltage of the vehicle generator 1) is larger than a predetermined reference value ΔVB1. If it is judged that the value of |ΔVB| is larger than the predetermined reference value ΔVB1, since it means that the large electrical load 4 is applied to the vehicle generator 1, causing the terminal voltage of the battery 3 to drop largely, and there is a possibility of malfunction of electronic equipment, the excitation-current-limit-value calculating section 204 corrects the control constant k0 so that it becomes small (0.9 times as small as its original value, for example) at step 1012. As a consequence, the excitation current limit value becomes large to increase the output voltage of the vehicle generator 1 to suppress the extent of the voltage decrease.

The above-described operation steps are performed every 5 ms, so that the excitation current limit value is renewed constantly. This excitation current limit value is sent to the generation voltage/excitation current control circuit 206, in accordance with which the MOS-FET is on/off controlled.

Figure 6:
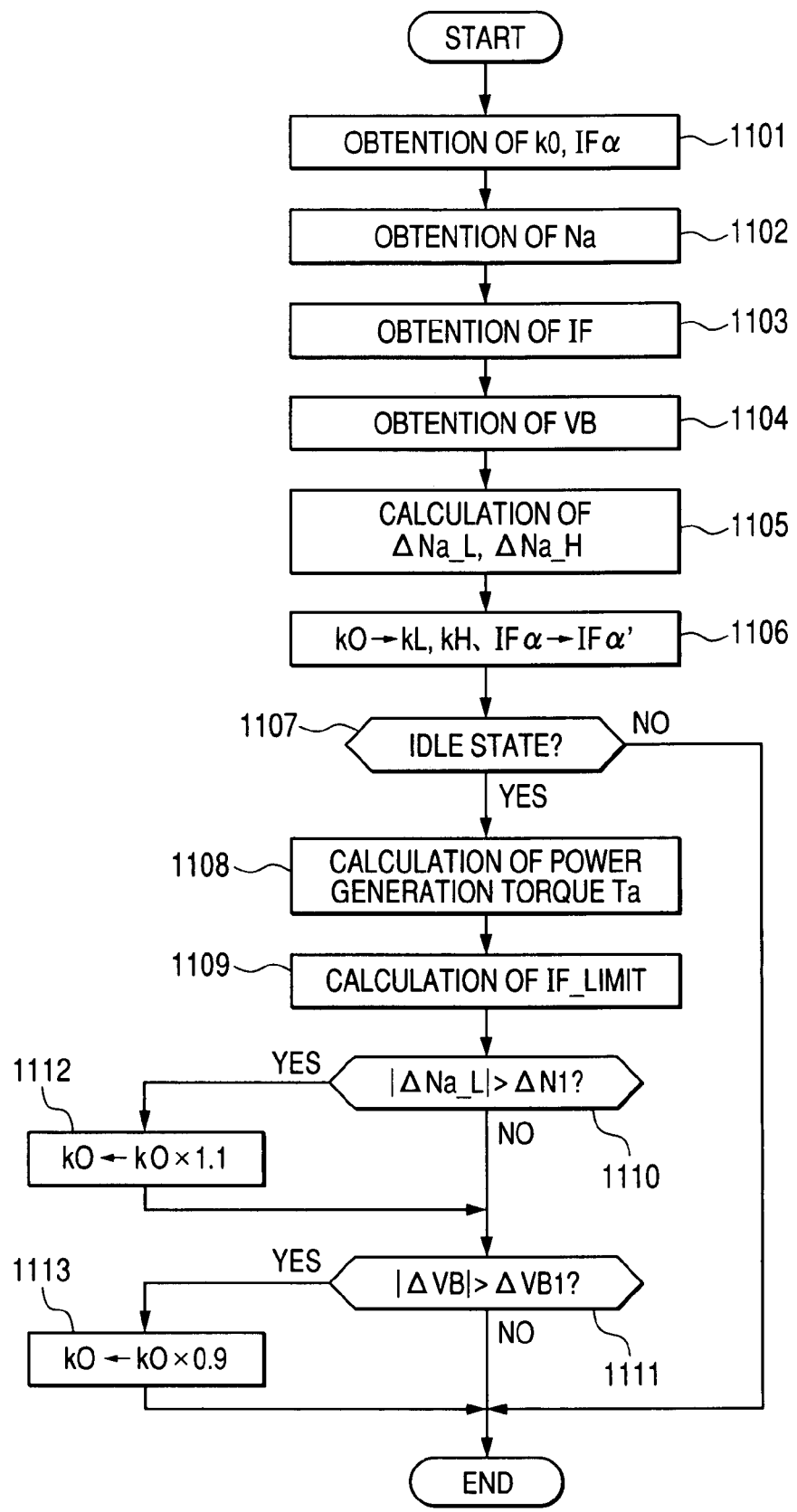
FIG. 6 is a flowchart showing different operation steps performed by the excitation-current-limit-value calculating section to determine the excitation current limit value.

FIG. 6 is a flowchart showing different operation steps performed by the excitation-current-limit-value calculating section 204 to determine the excitation current limit value. The operation steps shown in FIG. 6 is characterized in that, at the beginning, the power generation torque of the vehicle generator 1 is calculated, and then a target torque depending on the variation of the vehicle generator 1 is determined on the basis of the calculated power generation torque, the excitation current limit value being set at such a value that the power generation torque becomes equal to the determined target torque. The operations steps 1101 to 1107 and the operation steps 1110 to 1113 are similar to the operation steps 1001 to 1007, and the operation steps 1009 to 1012 shown in FIG. 5, respectively. The below described explanation focuses on the operation steps 1108, and 1109 whose equivalents are not included in the flowchart of FIG. 5.

At step 1108, the excitation-current-limit-value calculating section 204 determines the power generation torque Ta by searching a torque map stored in a memory (not shown) using the vehicle generator speed Na, the excitation current IF, and the output voltage VB as search parameters, and by performing interpolation as necessary.

Next, at step 1109, the excitation-current-limit-value calculating section 204 determines the target torque by subtracting the value of the rotational speed variation ΔNa multiplied by the control constant kH' from the determined power generation torque Ta, and calculates the excitation current limit value IF_LIMIT by performing inverse transformation of the determined target torque. If the control constant kH' is set at about the moment of inertia of a rotation system including the vehicle generator 1, the engine driving the vehicle generator 1, and other auxiliaries driven by the engine, it becomes possible to set the excitation current limit value at such a value that the power generation torque is reduced to a value necessary to enable a change from the rotational speed decrease to the rotational speed increase.

According to the operation steps shown in FIG. 6 in which the power generation torque is calculated to accurately set the excitation current limit value at the necessary and sufficient value for suppressing the rotational speed variation, it becomes possible to improve the stability of the engine speed, and the stability of the output voltage of the vehicle generator 1, and to suppress the variation of the output voltage of the vehicle generator 1 irrespective of change of the vehicle state.

Figure 7:
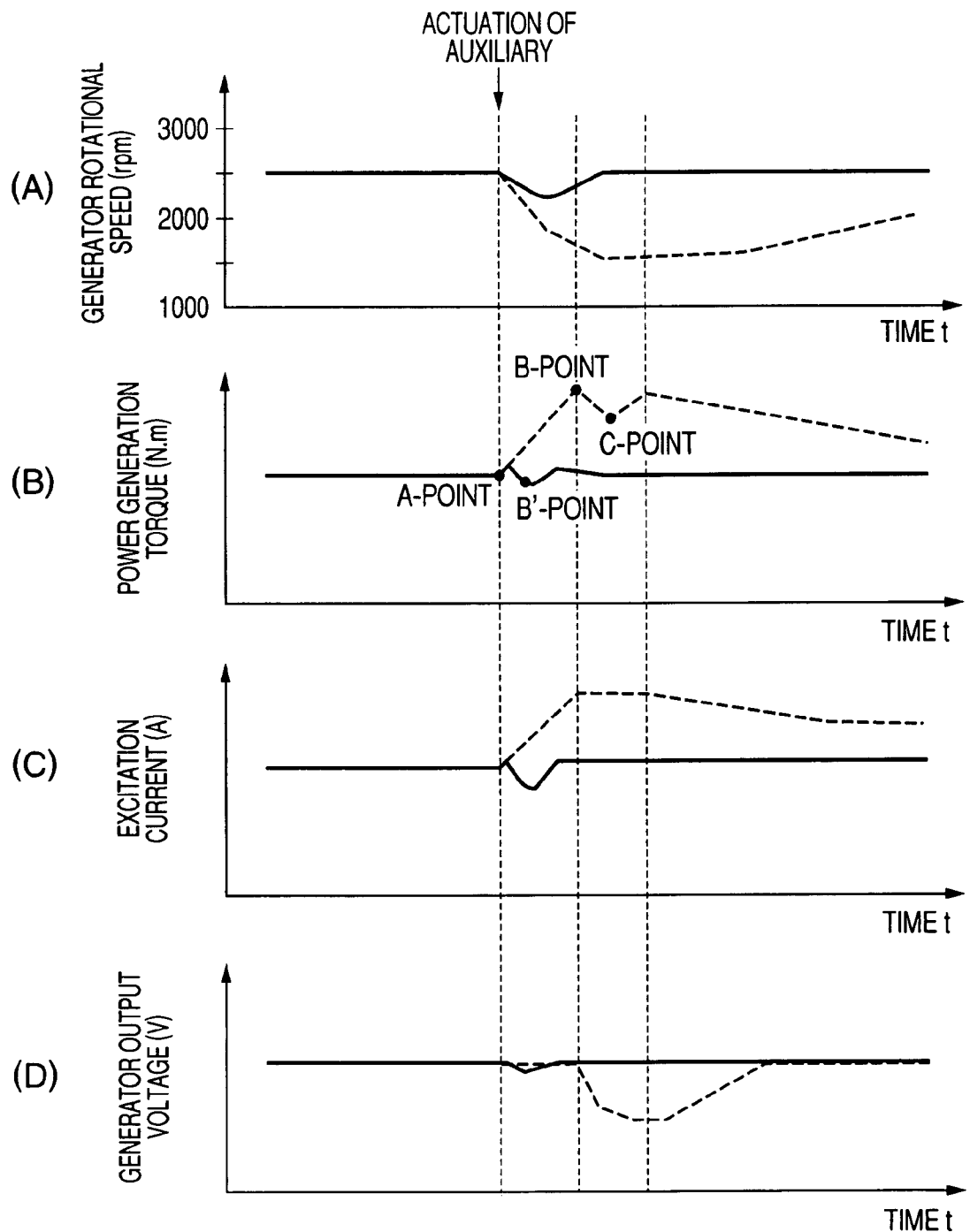
FIG. 7 is a time diagram showing the behavior of the vehicle generator shown in FIG. 1 when an engine speed of a vehicle engine driving the vehicle generator decreases by external disturbance.
Figure 8:
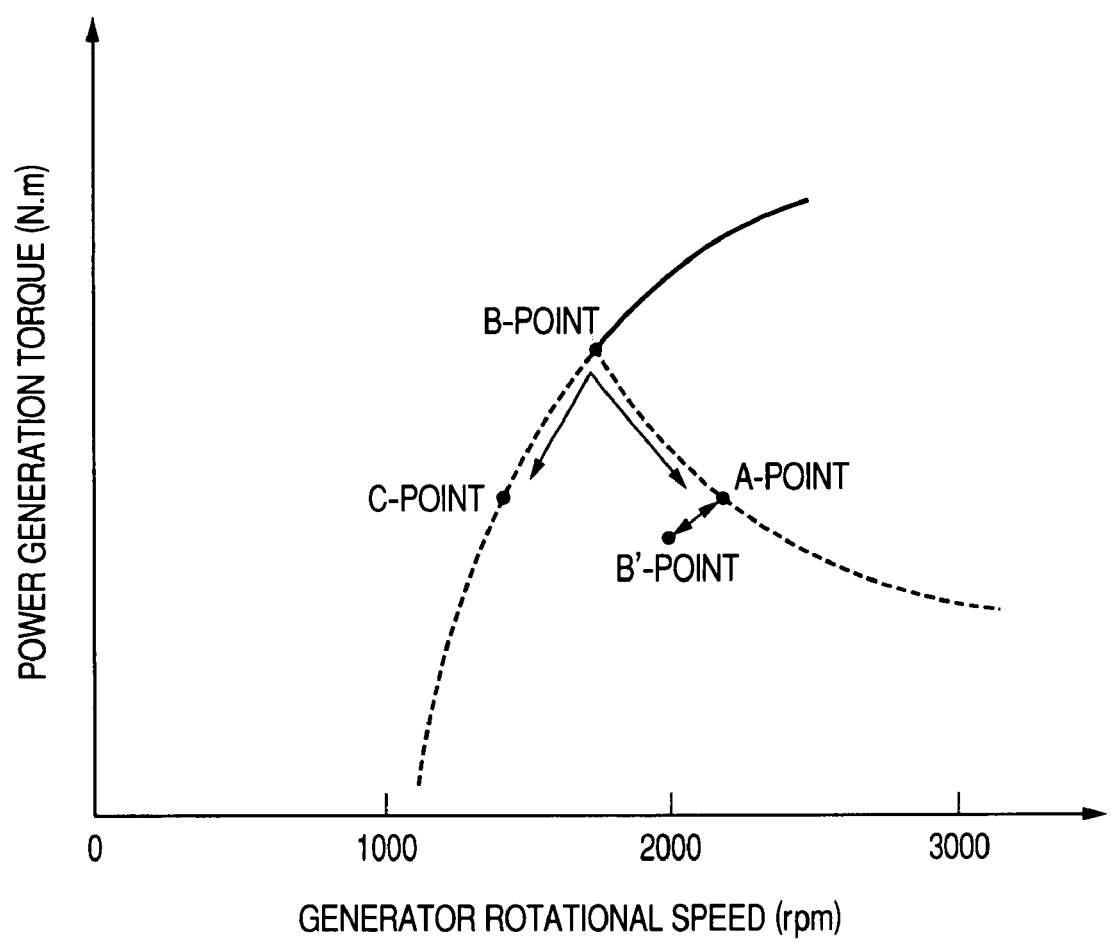
FIG. 8 is a graph showing a rotational speed-power generation torque (drive torque) characteristic of the vehicle generator shown in FIG. 1.

(3) When External Disturbance Occurs when the Engine is Idling:

Next, the operation of the vehicle-use power generation control apparatus 2 when the idle speed of the engine decreases by external disturbance, for example, by actuation of an auxiliary other than the vehicle generator 1 is explained. FIG. 7 is a time diagram showing the behavior of the vehicle generator 1 when the idle speed decreases by external disturbance. FIG. 8 is a graph showing a rotational speed-power generation torque (drive torque) characteristic of the vehicle generator 1. Here, it is assumed that one of the auxiliaries driven by the engine starts to operate at the timing shown by the arrow in (A) of FIG. 7, as a result of which the idle speed starts to decrease. In FIG. 7, the dotted curve shows a case of a conventional vehicle-use power generation control apparatus being used, and the solid curve shows a case of the vehicle-use power generation control apparatus of this embodiment being used. In FIG. 8, the dotted curve shows a case where the output voltage of the vehicle generator 1 is regulated at a constant value when the load current is 40 A.

In the case of the conventional vehicle-use power generation control apparatus, when the rotational speed of the generator decreases as the decrease of the idle speed, the excitation current increases, because the output voltage of the vehicle generator 1 decreases. As a result, the power generation torque increases, causing the decrease of the rotational speed of the vehicle generator 1, which accelerates the idle speed decrease (see the dotted curve in (A) of FIG. 7). Eventually, the MOS-FET supplying the excitation current is turned on with its maximum on-time duty ratio, causing the excitation current to flow at its maximum value (see the dotted curve in (C) of FIG. 7). As a result, the power generation torque shifts from the A-point to the B-point shown in (B) of FIG. 7, and FIG. 8. After that, the power generation torque starts to decrease. This decrease continues for a certain time period due to inertia. As a result, the power generation torque shifts from the B-point to the C-point shown in (B) of FIG. 7 and FIG. 8. Thereafter, the rotational speed of the vehicle generator1 gradually increases to return to its initial value. However, since engine intake air is increased as a result of an idle speed control performed on the engine control side while the engine rotational speed is low, the engine rotational speed and the vehicle rotational speed overshoot, and then downshoot. The rotational speed decrease due to undershoot is accelerated by the same reason explained above. Accordingly, the phenomenon called idle hunting in which the idle speed varies by from 100 rpm to 200 rpm in a cycle of several seconds occurs.

In contrast, according to the vehicle-use power generation control apparatus 2 of this embodiment in which the excitation current is limited so as to reduce the power generation torque when the decrease of the generator rotational speed is detected, the increase of the power generation torque due to the idle speed decrease caused by activation of an engine-driven auxiliary can be sufficiently suppressed compared to the case of using the conventional vehicle-use power generation control apparatus, because this embodiment operates to reduce the excitation current at such time. Accordingly, according to this embodiment, the extent of the idle speed decrease can be made sufficiently small, because the idle speed decrease can be prevented from being accelerated. In the case of using the vehicle-use power generation control apparatus 2 of this embodiment, the power generation torque shifts from the A-point to the B'-point shown in (B) of FIG. 7 and FIG. 8.

As described above, with the vehicle-use power generation control apparatus 2 of this embodiment, it becomes possible to prevent the drive torque (power generation torque) of the vehicle generator 1 from increasing sharply due to activation of an engine-driven auxiliary, or a gas pedal manipulation by a vehicle driver. This can stabilize the idle speed of the engine. Hence, according to this embodiment, it is possible to prevent the vehicle from vibrating when there occurs the decrease of the idle speed, or the idle hunting phenomenon due to the increase of the power generation torque of the vehicle generator 1, or when the engine speed decreases by activation of an engine-driven auxiliary. Also, it becomes possible to prevent the engine from stalling and to prevent lamps or indicators mounted on the vehicle from flickering due to the variation of the output voltage of the vehicle generator 1. Furthermore, according to this embodiment, fuel consumption can be improved, because this embodiment makes it possible to reduce the idle speed, and to reduce engine friction.

Figure 9:
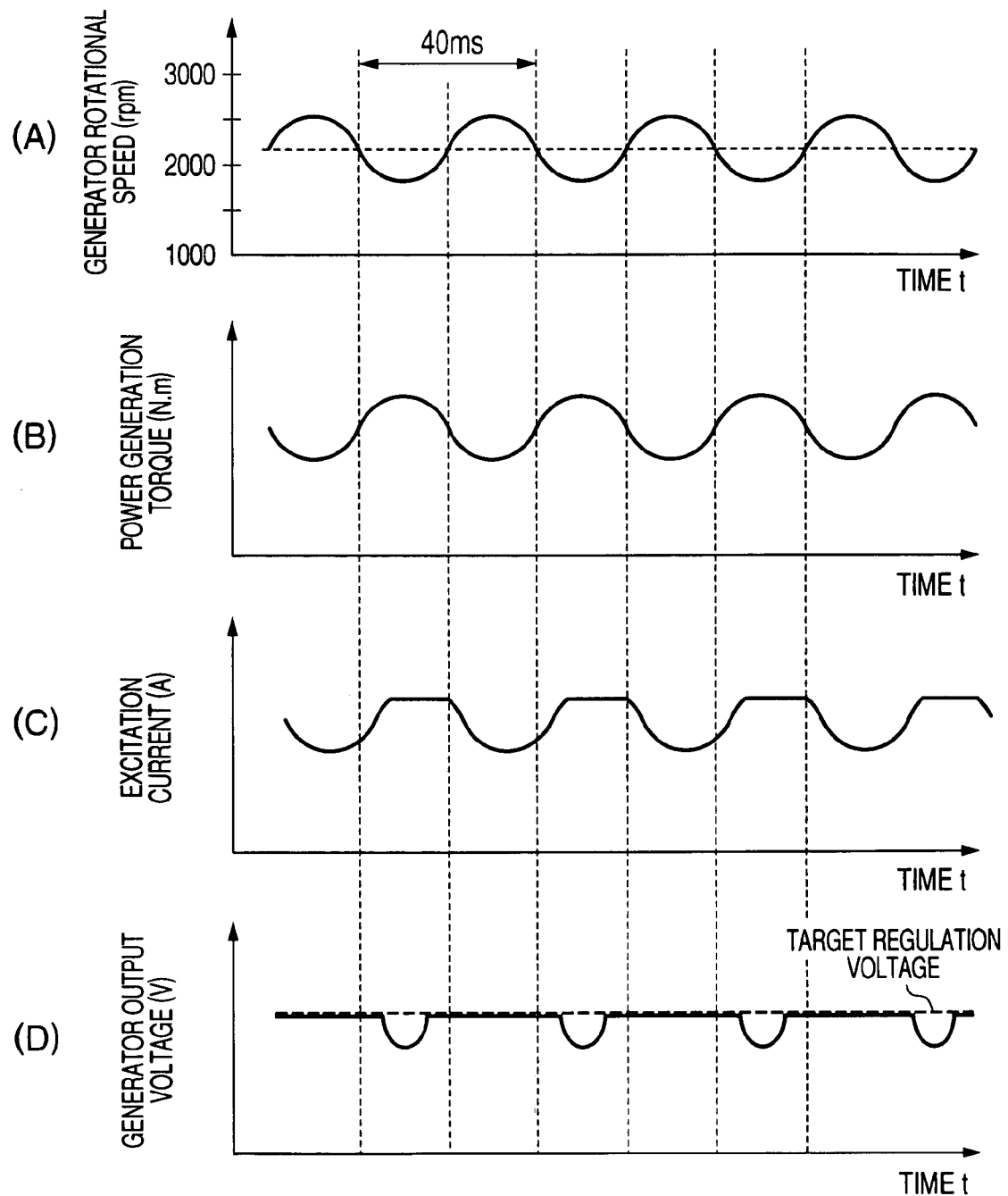
FIG. 9 is a diagram showing the behavior of the vehicle generator when there occurs rotational pulsation of the engine due to the engine combustion cycle in a case where the vehicle generator is controlled in a conventional vehicle-use power generation control apparatus.

(4) When the Rotational Pulsation Depending on the Engine Combustion Cycle Occurs when the Engine is Idling:

FIG. 9 is a diagram showing the behavior of the vehicle generator 1 when there occurs the rotational pulsation of the engine due to the engine combustion cycle in a case where the vehicle generator 1 is controlled by the conventional vehicle-use power generation control apparatus. As shown in (A) of FIG. 9, the rotational speed of the vehicle generator 1 varies periodically in a cycle of 40 ms, for example in synchronization with the ignition timing. As explained with reference to FIG. 8, since the excitation current increases causing the power generation torque to increase when the rotational speed of the vehicle generator 1 is lowered, the rotational pulsation of the engine is accelerated by the behavior of the vehicle generator 1. In addition, if the power generation capacity of the vehicle generator 1 runs short when the generator rotational speed is lowered, the output voltage of the vehicle generator 1 largely drops as shown in (D) of FIG. 9. Hence, the rotational pulsation may cause the engine to vibrate, and cause a belt transmitting a torque from the engine to the vehicle generator 1 to flutter. These problems are anticipated to matter more in the future, because of the recent increase in number of vehicles with a three-cylinder engine, and low-friction vehicles with good fuel economy, combined with the trend of increasing the power generation capacity of vehicle generators to deal with large electric power demand of recent vehicles.

FIG. 10 is a diagram showing the behavior of the vehicle generator 1 when there occurs the rotational pulsation of the engine due to the engine combustion cycle in a case where the vehicle generator 1 is controlled by the vehicle-use power generation control apparatus 2 according to this embodiment of the invention. As seen from FIG. 10, with the vehicle-use power generation control apparatus 2 in which the excitation current is limited so as to reduce the power generation torque when the decrease of the generator rotational speed is detected, it is possible to reduce the power generation torque of the vehicle generator 1 when the engine speed decreases after it increases at the ignition timing. Accordingly, the decrease and variation of the engine speed depending on the engine combustion cycle can be sufficiently suppressed compared to the case of using the conventional vehicle-use power generation control apparatus.

Furthermore, although the reduction of the excitation current when the engine speed decreases causes the terminal voltage of the battery to drop, the extent of the voltage drop is small, because the decreased of the engine speed is suppressed to a small value. Also, since the reduction of the excitation current is removed to increase the excitation current when the engine speed increases, the terminal voltage of the battery can be well adjusted around the target regulation voltage compared to the case of using the conventional vehicle-use power generation control apparatus.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use power generation control apparatus for regulating an output voltage of a vehicle generator driven by a vehicle engine at a set value by on/off controlling an excitation current flowing through an excitation winding of said vehicle generator, comprising:

a rotation detecting circuit detecting a rotational speed of said vehicle generator; and an excitation current control circuit reducing, when said rotation detecting circuit detects decrease of said rotational speed, said excitation current at a rate depending on a rate of said decrease of said rotational speed detected by said rotation detecting circuit.

2. The vehicle-use power generation control apparatus according to claim 1, wherein when said rotation detecting circuit does not detect decrease of said rotational speed of said vehicle generator, said excitation current control circuit removes reduction of said excitation current.

3. The vehicle-use power generation control apparatus according to claim 1, wherein said excitation current control circuit limits said excitation current to within a limit value calculated by subtracting a value of said rate of said decrease of said rotational speed multiplied by a predetermined control constant from a value of said excitation current currently flowing.

4. The vehicle-use power generation control apparatus according to claim 3, wherein said control constant is corrected in accordance with at least one of said detected rotational speed, an output voltage, and said excitation current of said vehicle generator.

5. The vehicle-use power generation control apparatus according to claim 3, wherein said control constant is corrected in accordance with one of a variation of said detected rotational speed and a variation of said output voltage of said vehicle generator when said excitation current control circuit reduces said excitation current.

6. The vehicle-use power generation control apparatus according to claim 3, wherein said excitation current control circuit receives said control constant from a control device external of said vehicle-use power generation control apparatus.

7. The vehicle-use power generation control apparatus according to claim 1, wherein said excitation current control circuit calculates a target torque by subtracting, from a power generation torque of said vehicle generator determined on the basis of a value of said excitation current currently flowing, and said detected rotational speed of said vehicle generator, a value of said rate of said decrease of said detected rotational speed multiplied by a predetermined control constant, and limits said excitation current to such a value that said power generation torque of said vehicle generator becomes equal to said calculated target torque.

8. The vehicle-use power generation control apparatus according to claim 7, wherein said control constant is substantially equal to a value corresponding to sum of moments of inertia of said vehicle generator, said vehicle engine and engine auxiliaries driven by said vehicle engine.

9. The vehicle-use power generation control apparatus according to claim 7, wherein said control constant is corrected in accordance with at least one of said detected rotational speed, an output voltage, and said excitation current of said vehicle generator.

10. The vehicle-use power generation control apparatus according to claim 7, wherein said control constant is corrected in accordance with one of a variation of said detected rotational speed and a variation of said output voltage of said vehicle generator when said excitation current control circuit reduces said excitation current.

11. The vehicle-use power generation control apparatus according to claim 7, wherein said excitation current control circuit receives said control constant from a control device external of said vehicle-use power generation control apparatus.

12. The vehicle-use power generation control apparatus according to claim 1, wherein when said rotation detecting circuit does not detect decrease of said rotational speed of said vehicle generator, said excitation current control circuit gradually increases said excitation current at a certain rate.

13. The vehicle-use power generation control apparatus according to claim 12, wherein said certain rate is corrected in accordance with at least one of said detected rotational speed, an output voltage, and said excitation current of said vehicle generator.

14. The vehicle-use power generation control apparatus according to claim 12, wherein said certain rate is corrected in accordance with at least one of a variation of said detected rotational speed and a variation of an output voltage of said vehicle generator when said excitation current control circuit reduces said excitation current.

15. The vehicle-use power generation control apparatus according to claim 12, wherein said excitation current control circuit receives said certain rate from a control device external of said vehicle-use power generation control apparatus.

16. The vehicle-use power generation control apparatus according to claim 1, wherein said rotation detecting circuit and said excitation current control circuit are built in said vehicle generator.

17. The vehicle-use power generation control apparatus according to claim 1, wherein said rotation detecting circuit is configured to detect decrease of said rotational speed in which effect of rotational pulsation depending on an engine combustion cycle of said vehicle engine is reduced.

18. The vehicle-use power generation control apparatus according to claim 1, wherein said rotation detecting circuit is configured to detect decrease of said rotational speed in only effect of rotational pulsation depending on an engine combustion cycle of said vehicle engine.

19. The vehicle-use power generation control apparatus according to claim 1, wherein said excitation current control circuit is configured to individually detect a comparatively rapid decrease of said rotational speed due to an engine combustion cycle of said vehicle engine, and a comparatively gentle decrease of said rotational speed due to at least one of torque variation of said vehicle generator, torque variation of an engine auxiliary driven by said vehicle engine other than said vehicle engine, and variation of intake air amount, configured to calculate a first limit value on the basis of a value of said comparatively rapid decrease and a second limit value on the basis of a value of said comparatively gentle decrease, and configured to limit said excitation current to within a smaller one of said first limit value and said second limit value.

\* \* \* \* \*